(12) United States Patent
Lim (10) Patent No.: US 8,983,121 B2
(45) Date of Patent: Mar. 17, 2015

(54) IMAGE PROCESSING APPARATUS AND METHOD THEREOF

(75) Inventor: Jeong-eun Lim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 325 days.

(21) Appl. No.: 13/282,839

(22) Filed: Oct. 27, 2011

(65) Prior Publication Data

US 2012/0106791 A1    May 3, 2012

(30) Foreign Application Priority Data

Oct. 27, 2010 (KR) .................. 10-2010-0105380
Oct. 12, 2011 (KR) .................. 10-2011-0104091

(51) Int. Cl.
*G06K 9/00* (2006.01)
*G06K 9/34* (2006.01)
*G06T 7/00* (2006.01)

(52) U.S. Cl.
CPC .............. *G06K 9/00771* (2013.01); *G06K 9/34* (2013.01); *G06T 7/0079* (2013.01)
USPC ........... 382/103; 382/106; 382/111; 382/154; 382/159; 382/190

(58) Field of Classification Search
USPC ......................... 382/100, 103, 190
See application file for complete search history.

(56) References Cited

U.S. PATENT DOCUMENTS

| | | | | |
|---|---|---|---|---|
| 6,005,987 | A * | 12/1999 | Nakamura et al. | 382/294 |
| 7,088,243 | B2 * | 8/2006 | Jin et al. | 340/541 |
| 7,257,237 | B1 * | 8/2007 | Luck et al. | 382/103 |
| 7,257,249 | B2 * | 8/2007 | Farsaie | 382/154 |
| 7,389,000 | B2 * | 6/2008 | Takeda et al. | 382/276 |
| 7,957,562 | B2 * | 6/2011 | Chang et al. | 382/113 |
| 8,073,197 | B2 * | 12/2011 | Xu et al. | 382/103 |
| 8,121,400 | B2 * | 2/2012 | Tsai et al. | 382/154 |
| 8,331,614 | B2 * | 12/2012 | Mannerheim et al. | 382/103 |
| 2002/0009211 | A1 * | 1/2002 | Braspenning et al. | 382/107 |
| 2004/0101162 | A1 * | 5/2004 | Higaki et al. | 382/103 |
| 2004/0239761 | A1 * | 12/2004 | Jin et al. | 348/153 |
| 2004/0247157 | A1 * | 12/2004 | Lages et al. | 382/103 |
| 2005/0286756 | A1 * | 12/2005 | Hong et al. | 382/154 |

(Continued)

FOREIGN PATENT DOCUMENTS

| | | |
|---|---|---|
| JP | 2006-301962 A | 11/2006 |
| JP | 2009-124618 A | 6/2009 |

(Continued)

OTHER PUBLICATIONS

Iwase, Tracking soccer players based on Homography among Multiple Views, 2003, Department of Information and Computer Science, Yokohama, Japan.*

*Primary Examiner* — Chan Park
*Assistant Examiner* — Iman K Kholdebarin
(74) *Attorney, Agent, or Firm* — Sughrue Mion, PLLC (57) ABSTRACT

An image processing apparatus such as a surveillance apparatus and method thereof are provided. The image processing apparatus includes: an object detecting unit which detects a plurality of moving objects from at least one of two or more images obtained by photographing a surveillance area from two or more view points, respectively; a depth determination unit which determines depths of the moving objects based on the two or more images, wherein the depth determination unit determines the moving objects as different objects if the moving objects have different depths.

8 Claims, 9 Drawing Sheets

(56) References Cited

U.S. PATENT DOCUMENTS

| | | | |
|---|---|---|---|
| 2007/0086646 A1* | 4/2007 | Yang et al. | 382/154 |
| 2008/0166045 A1* | 7/2008 | Xu et al. | 382/170 |
| 2008/0225045 A1* | 9/2008 | Birtwistle et al. | 345/420 |
| 2008/0226160 A1* | 9/2008 | Birtwistle et al. | 382/154 |
| 2008/0240496 A1* | 10/2008 | Senior | 382/103 |
| 2009/0041342 A1* | 2/2009 | Chen | 382/162 |
| 2009/0129629 A1* | 5/2009 | Cheng et al. | 382/103 |
| 2009/0296984 A1* | 12/2009 | Nijim et al. | 382/103 |
| 2009/0324059 A1* | 12/2009 | Boughorbel | 382/154 |
| 2010/0201682 A1* | 8/2010 | Quan et al. | 345/419 |
| 2010/0265331 A1* | 10/2010 | Tanaka | 348/159 |
| 2010/0277571 A1* | 11/2010 | Xu et al. | 348/47 |
| 2011/0032341 A1* | 2/2011 | Ignatov et al. | 348/51 |
| 2011/0169923 A1* | 7/2011 | Dellaert et al. | 348/47 |
| 2012/0106791 A1* | 5/2012 | Lim | 382/103 |
| 2012/0269391 A1* | 10/2012 | Saito | 382/103 |
| 2012/0294521 A1* | 11/2012 | Lee et al. | 382/164 |
| 2013/0136307 A1* | 5/2013 | Yu et al. | 382/103 |
| 2014/0063188 A1* | 3/2014 | Smirnov et al. | 348/43 |

FOREIGN PATENT DOCUMENTS

| | | | |
|---|---|---|---|
| KR | 10-2003-0076906 A | | 9/2003 |
| KR | 10-2003-0091394 A | | 12/2003 |
| KR | 1020070025004 | * | 3/2007 |
| KR | 10-2008-0083999 A | | 9/2008 |
| KR | 10-2011-0065399 A | | 6/2011 |
| KR | 10-2011-0071213 A | | 6/2011 |
| WO | 2011/071313 A2 | | 6/2011 |

* cited by examiner

IMAGE PROCESSING APPARATUS AND METHOD THEREOF

CROSS-REFERENCE TO RELATED PATENT APPLICATIONS

This application claims priority from Korean Patent Application No. 10-2010-0105380, filed on Oct. 27, 2010 in the Korean Intellectual Property Office, and Korean Patent Application No. 10-2011-0104091 filed on Oct. 12, 2011 in the Korean Intellectual Property Office, the disclosures of which are incorporated herein in their entirety by reference.

BACKGROUND

1. Field

Apparatuses and methods consistent with exemplary embodiments relate to image processing, and more particularly, to intelligent security surveillance.

2. Description of the Related Art

Recently, surveillance cameras are installed inside and outside of buildings, in the streets, etc. for various purposes such as crime prevention, security, or the like. A surveillance camera may be connected to a server via a network in a wired or wireless manner, and the server may simultaneously control a plurality of the surveillance cameras connected to one another.

In a surveillance system including a surveillance camera and a server, it may be determined whether a specific incident, that is, an event has occurred in a surveillance area by using a captured image. When a moving object is detected from the captured image, if the detected object satisfies a specific condition, it is determined that an event has occurred. The surveillance system accurately determines whether an event has occurred in order to increase a surveillance performance. Thus, research has been widely conducted on a surveillance apparatus for effectively processing a captured image.

SUMMARY

Exemplary embodiments provide a surveillance apparatus for increasing a surveillance performance with respect to a surveillance area, and a surveillance method thereof.

According to an aspect of an exemplary embodiment, there is provided an image processing apparatus including: an object detecting unit which detects a plurality of moving objects from at least one of two or more images obtained by photographing a surveillance area from two or more view points, respectively; a depth determination unit which determines depths of the moving objects based on the two or more images, wherein the depth determination unit determines the moving objects as different objects if the moving objects have different depths. The depths of the moving objects indicate distances between the image input unit and the moving objects, respectively. The image processing apparatus may be a surveillance apparatus.

The depth determination unit detects a disparity vector between the two or more images with regard to each of the moving objects to determine a depth of each of the moving objects. The image processing apparatus may further include an object combining unit which sets at least two objects among the moving objects as one object if the at least two objects have depths a difference of which is less than a first threshold value.

The image processing apparatus may further include a texture determination unit which determines texture similarity between the at least two objects by detecting texture information thereof. Here, the object combining unit may set the at least two objects, determined as one object based on the depth difference of the at least two objects, as different objects, if the at least two objects have texture information a difference of which is greater than a second threshold value.

The texture similarity may be determined using a foreground area within an outline area of the moving objects.

The object combining unit may combine the at least two objects as one object if the difference of the depths of the at least two objects is less than the first threshold value and the difference of the texture information of the at least two objects is less than the second threshold value.

The image processing apparatus may further include an event detecting unit which indicates that an event has occurred when at least one of the moving objects has a depth satisfying a specific condition.

The depths of the specific condition may be set by a user.

The image processing apparatus may further include a photographing unit which photographs the two or more images from the two or more different view points.

The image processing apparatus may further include a communication unit which receives the two or more images from the outside.

According to an aspect of another exemplary embodiment, there is provided an image processing method including: detecting a plurality of moving objects from at least one of two or more images obtained by photographing a surveillance area from two or more view points, respectively; determining depths of the moving objects based on the two or more images; and determining the moving objects as different objects if the moving objects have different depths. The surveillance method may further include setting at least two objects among the moving objects as one object if the at least two objects have depths a difference of which is less than a first threshold value.

The surveillance method may further include: if at least two objects of the moving objects have respective depths a difference of which is less than a first threshold, detecting texture information of the at least two objects to determine similarity of the texture information; and if a difference of the texture information of the at least two objects is less than a second threshold, setting the at least two objects as one object.

BRIEF DESCRIPTION OF THE DRAWINGS

The above and other aspects will become more apparent by describing in detail exemplary embodiments thereof with reference to the attached drawings, in which.

DETAILED DESCRIPTION OF EXEMPLARY EMBODIMENTS

As used herein, the term "and/or" includes any and all combinations of one or more of the associated listed items.

Hereinafter, the inventive concept will be described in detail by explaining exemplary embodiments with reference to the attached drawings. The same reference numerals in the drawings denote the same element, and a repeated description thereof will be omitted.

The detailed description and the drawings are introduced to provide understanding of the inventive concept and the detailed descriptions of well-known technologies may be omitted. In addition, the specification and the drawing are not provided to limit the scope of the inventive concept and the scope of the inventive concept is defined by claims. The terminologies used herein are for the purpose of describing exemplary embodiments well, and thus, may be interpreted to correspond to the inventive concept.

Figure 1:
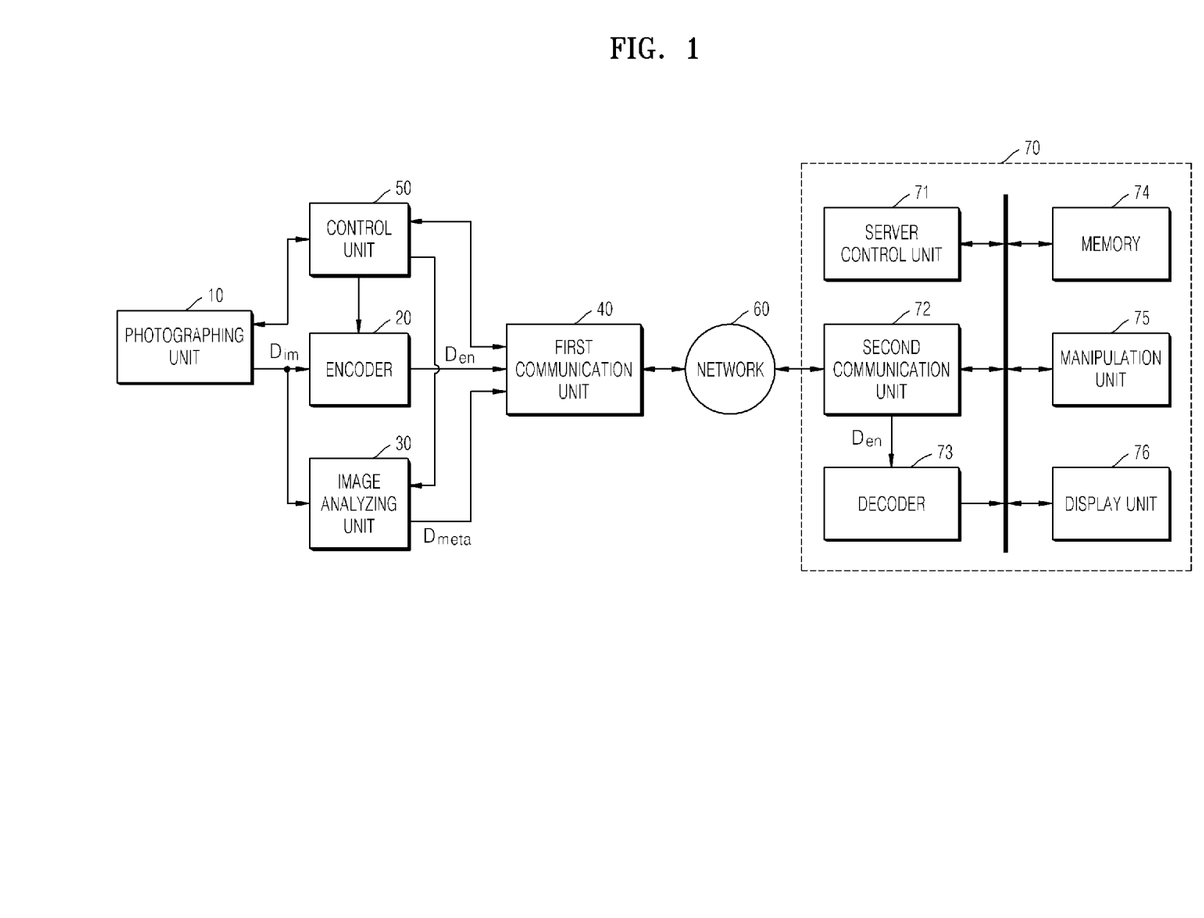
FIG. 1 is a block diagram of an image processing system such as a surveillance system including a surveillance apparatus, according to an exemplary embodiment.

FIG. 1 is a block diagram of an image processing system such as a surveillance system including a surveillance apparatus, according to an exemplary embodiment.

Referring to FIG. 1, the surveillance system includes a photographing unit 10, an encoder 20, an image analyzing unit 30, a first communication unit 40, a control unit 50, a network 60, and a server 70.

The photographing unit 10 captures an image to generate image data Dim. The photographing unit 10 may photograph a predetermined area, for example, a surveillance area. Alternatively, the photographing unit 10 may change an area to be photographed by an external manipulation.

The photographing unit 10 may capture a first image at a first view point and a second image at a second view point which is different from the first view point with respect to the area to be photographed, and may generate the image data Dim with regard to the captured first and second images. In this regard, the photographing unit 10 may simultaneously capture the first and second images by including a plurality of lenses and a plurality of imaging devices in one apparatus. For example, the photographing unit 10 may be installed in a multi-view stereo camera, a time of flight (TOF)-based three-dimensional (3D) sensor, a Kinect (Microsoft Corporation), or the like. However, the inventive concept is not limited thereto, and the photographing unit 10 may include a plurality of apparatuses that are installed in different places to photograph the same area.

The encoder 20 receives the image data Dim with regard to the first and second images captured by the photographing unit 10, and compresses the image data Dim by encoding the image data Dim. The encoder 20 may include a 3D multi-view movie codec that may encode a stereo image or a 3D image. The encoder 20 encodes the image data Dim to generate encoding data Den. The encoder 20 transmits the generated encoding data Den to the first communication unit 40.

The image analyzing unit 30, which is a device capable of processing a digital image signal, receives the image data Dim from the photographing unit 10, and performs image analysis with respect to the received image data Dim. The image analyzing unit 30 may be an intelligent image search engine that may detect an event by analyzing a stereo image or a 3D image. The image analyzing unit 30 may detect a plurality of moving objects from the image data Dim and extract depth information and texture information of the detected objects. The depth may refer to a distance between the object detected from the image data Dim and an image capture device. The image capture device may be the photographing unit 10. In this regard, even when coordinates of objects in a 2D image are the same, real distances thereof can be different. The image analyzing unit 30 extracts information regarding the depth. The texture information includes colors, brightness, outline information, etc. of the detected objects.

The image analyzing unit 30 detects whether an event has occurred through image analysis, and generates metadata Dmeta including information regarding a result of the image analysis. In this regard, the event includes an event that utilizes depth information and an event that simply utilizes a 2D image, that is, an event that utilizes only first and second images. An event detecting unit 34 (see FIG. 3) included in the image analyzing unit 30 generates an alarm only with respect to an object having a depth of a specific condition. The image analyzing unit 30 may detect an object having a specific depth that is set by a user or an object passing through the specific depth to generate an alarm. The image analyzing unit 30 may also generate an alarm when a specific area on a screen in a 2D image and a user correspond to a designated event. The image analyzing unit 30 transmits the generated metadata Dmeta to the first communication unit 40.

The first communication unit 40 transmits the encoding data Den received from the encoder 20 in the form of bit stream via the network 60 to the server 70. The first communication unit 40 transmits the metadata Dmeta, which is received from the image analyzing unit 30 and the control unit 50, or various control signals and data via the network 60 to the server 70. The first communication unit 40 also receives the various control signals and the data transmitted from the server 70 via the network 60 to transmit the various control signals and the data to the control unit 50. The communication unit 40 may transmit the various control signals and the data to the server 70 in a wired manner and/or in a wireless manner.

The control unit 50 controls operations of the photographing unit 10, the encoder 20, the image analyzing unit 30, and the first communication unit 40 according to a control signal received from the server 70 via the first communication unit 40 or a predetermined algorithm.

In the current exemplary embodiment, the photographing unit 10, the encoder 20, the image analyzing unit 30, the first communication unit 40, and the control unit 50 may be devices that are separately installed. For example, the photographing unit 10 may be a single surveillance camera, and the remaining units may be image processing devices that are separately installed. However, the inventive concept is not limited thereto, and the surveillance camera may include all of the photographing unit 10, the encoder 20, the image analyzing unit 30, the first communication unit 40, and the control unit 50. Alternatively, when the photographing unit 10 is a surveillance camera, the surveillance camera may be installed in a device different from a device in which the encoder 20, the image analyzing unit 30, the first communication unit 40, and the control unit 50 are installed.

The network 60 is a device that may send/receive data or control signals via a communication channel and an image data channel. The network 60 may be any device capable of sending/receiving data or commands in a wired or wireless manner. For example, the network 60 may connect the photographing unit 10 and the server 60 through a cable in a wired manner, and may connect the photographing unit 10 and the server 60 through a wireless local area network (LAN).

The server 70 may display a captured image in real time by decoding the encoding data Den received via the network 60. The server 70 may also inform an event generated in a surveillance area to a user by analyzing metadata Dmeta. The server 70 may include a server control unit 71, a second communication unit 72, a decoder 73, a memory 74, a manipulation unit 75, and a display unit 76.

The server control unit 71 controls operations of components included in the server 70. The server control unit 71 also receives a manipulation signal from the manipulation unit 75 and generates a command signal for controlling the server 70 or the photographing unit 10 based on the received manipulation signal.

The server control unit 71 may perform various image signal processing with respect to the image data Dim decoded by the decoder 72. The server control unit 71 may also convert a format of the image data Dim transmitted by the first communication unit 40 into a format that may be reproduced in the display unit 76.

Meanwhile, the server control unit 71 of the current exemplary embodiment detects a result of image analysis from the metadata Dmeta that is received via the second communication unit 72. In this regard, the server control unit 71 may determine whether an event has occurred in a captured image, and may control the display unit 76, etc. so that a manager may recognize occurrence of the event through an alarm using the display unit 76.

The second communication unit 72 receives bit stream with regard to the encoding data Den transmitted by the first communication unit 40, and transmits the received encoding data Den to the decoder 73. The second communication unit 72 transmits the metadata Dmeta that does not need to be decoded, various data, and control signals directly to a corresponding unit, for example, the server control unit 71. The second communication unit 72 also transmits a control signal for controlling the control unit 50 received from the server control unit 71 to the first communication unit 40 via the network 60.

The decoder 73 receives the encoding data Den from the second communication unit 72, and decodes the received encoding data Den. The decoder 73 decompresses the encoding data Den by the decoding operation and restores the original image data Dim.

The memory 74 may store an algorithm for controlling the server 70 or various setting data, and may temporarily store various data. The memory 74 may also generate and store an image file including the received image data Dim.

The manipulation unit 75 may include various buttons or a lever for controlling operations of the server 70 or the photographing unit 10. The manipulation unit 75 transmits a manipulation signal to the server control unit 71 based on user's manipulation.

The display unit 76 may display an image captured by the photographing unit 10, for example, the first image or the second image, or an image stored in the memory 74. The display unit 76 may also display various setting pictures for controlling the photographing unit 10, an alarm for indicating occurrence of an event, and the like.

In the current exemplary embodiment, the method of transmitting the image data Dim and the metadata Dmeta via the network 60 to the server 70 has been described, but the inventive concept is not limited thereto. For example, the image data Dim and the metadata Dmeta may be stored in a storage medium, and then, the storage medium may be connected to the server 70, so that a captured image or an alarm indicating occurrence of an event may be displayed on the display unit 76.

Figure 2:
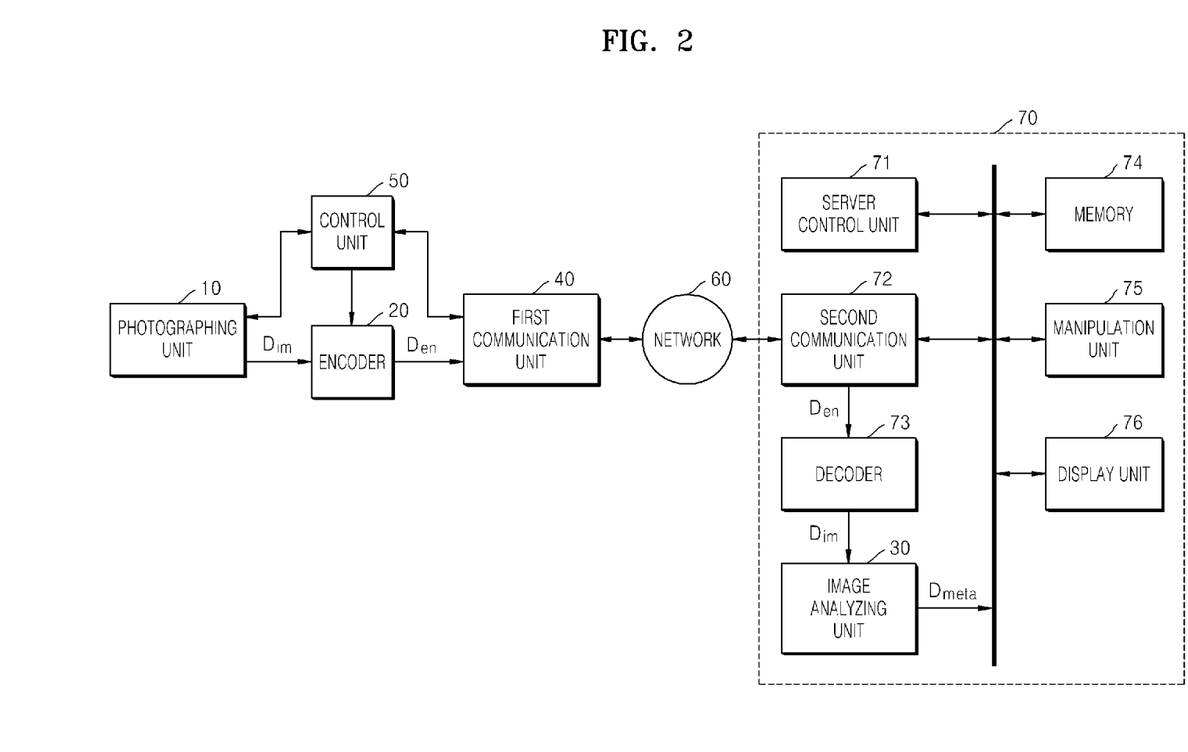
FIG. 2 is a block diagram of an image processing system such as a surveillance system including a surveillance apparatus, according to another exemplary embodiment.

FIG. 2 is a block diagram of an image processing system such as a surveillance system including a surveillance apparatus, according to another exemplary embodiment. The surveillance system of the current exemplary embodiment has a similar configuration of the surveillance system illustrated in FIG. 1, and thus, only differences therebetween will be described below.

Referring to FIG. 2, a server 70 includes an image analyzing unit 30.

Image data Dim regarding first and second images captured by a photographing unit 10 is encoded to encoding data Den by an encoder 20. The encoding data Den is transmitted to the server 70 in the form of bit stream by a first communication unit 40.

The server 70 transmits the encoding data Den received via a second communication unit 72 to a decoder 73, and the decoder 73 decompresses the encoding data Den by a decoding operation and restores the original image data Dim. The decoder 73 transmits the restored image data Dim to an image analyzing unit 30. Although not shown in FIG. 2, the restored image data Dim is transmitted to a server control unit 71, and thus, various image signal processing may be performed on the restored image data Dim.

The image analyzing unit 30 performs an image analysis by using the received image data Dim. The image analyzing unit 30 may be an intelligent image search engine capable of detecting an event by analyzing an image from a stereo camera, a TOF-based 3D sensor, a Kinect (Microsoft Corporation), or a 3D image. In particular, the image analyzing unit 30 of the current embodiment may detect a plurality of moving objects from the image data Dim, and extract depth information and texture information of the detected objects. The image analyzing unit 30 may detect the event by utilizing the depth information or using only 2D image. The image analyzing unit 30 detects whether an event has occurred through image analysis, and generates metadata Dmeta including information regarding a result of the image analysis. The image analyzing unit 30 transmits the generated metadata Dmeta to the server control unit 71.

Hereinafter, the image analyzing unit 30 will be described in more detail.

Figure 3:
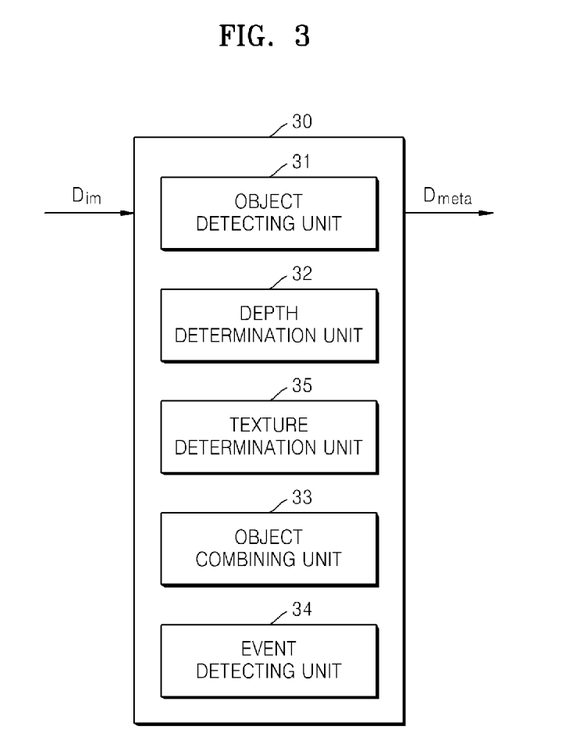
FIG. 3 is a block diagram of an image analyzing unit of FIGS. 1 and 2, according to an exemplary embodiment.

FIG. 3 is a block diagram of the image analyzing unit 30 of FIGS. 1 and 2, according to an exemplary embodiment.

Referring to FIG. 3, the image analyzing unit 30 includes an object detecting unit 31, a depth determination unit 32, a texture determination unit 35, an object combining unit 33, and an event detecting unit 34.

The object detecting unit 31 detects a plurality of moving objects from a captured image by using the received image data Dim. That is, the object detecting unit 31 divides the captured image into a foreground pixel and a background pixel. The object detecting unit 31 uses an object detection algorithm with respect to a reference image from among a first image and a second image. In this regard, the reference image may be an image to be displayed on the display unit 76, and for convenience of description, a case where the first image is the reference image will be described below. Meanwhile, the object detection algorithm may be, for example, a Gaussian mixture model. However, this is just an example, and any of various object detection algorithms may be used.

The object detecting unit 31 may assign an identifier (ID) to each of the detected objects, of number each of the detected objects. Also, the object detecting unit 31 may generate an outline that surrounds the detected object, that is, an outline showing a range of the object. The outline may have a rectangular shape or an oval shape which includes the object, but the inventive concept is not limited thereto.

The depth determination unit 32 extracts depth information of the detected objects by detecting a disparity vector with respect to each of the detected objects from the first and second images. In this regard, the depth determination unit 32 determines a depth continuity of the detected objects. The depth determination unit 32 labels differently areas having different depths in a depth map. The disparity vector may include information regarding a depth obtained by capturing two images of the object from two different view points. When an object is detected only with respect to a single 2D image, it is difficult to know depth information of the detected object. Accordingly, a single object may be recognized as a plurality of objects because of factors such as occlusion, a shadow, a dynamic scene, and the like. Thus, detecting an object from a single 2D image and determining whether an event has occurred according to a result of the detection may result in reduction in reliability of a surveillance system. Therefore, in the current exemplary embodiment, the depth information is extracted by the depth determination unit 32 as described above, and the depth map including depth information is generated.

The texture determination unit 35 extracts texture information of objects detected by the object detecting unit 31 and determines texture similarity between the detected objects by comparing the texture information. The texture information used to determine the texture similarity includes colors, brightness, outlines, and the like of the detected objects.

The determination of the texture similarity may be performed as follows. The texture similarity may be determined using a foreground area within an outline area. In this regard, a measurement for determining the texture similarity may use various descriptors, for example, a homogeneous texture descriptor (HTD), an edge histogram descriptor, a texture browsing descriptor, or the like.

The HTD is included in a moving picture experts group 7 (MPEG7) which is a multimedia information search standard, and the HTD is represented as follows.

HTD=[fDC,fsd,e1,e2,e30,d1,d2,d30]

The first and second components, fDC and fsd, are obtained by calculating an average of pixel brightness of an image and a standard deviation. The remaining components are obtained by Gabor-filtering an image in a frequency domain, and may comprise thirty energy e1, e2, and e30 of each feature value channel and thirty energy deviations d1, d2, and d30.

The texture similarity d may be calculated by using Equation 1 below, $$d(TD_{query}, TD_{Database}) = \sum_{k} \left| \frac{w(k)[TD_{query}(k) - TD_{Database}(k)]}{a(k)} \right|, \quad (1)$$

where, w(k) denotes a weighted value of a feature value vector, and a(k) is a nomarlization component and denotes a standard deviation of respective feature value vectors of images. If a value d representing the texture similarity is less than a predetermined value, the texture determination unit 35 determines that textures of the detected objects are similar to one another.

The object combining unit 33 re-searches and labels objects determined to be the same object from among the objects detected by the object detecting unit 31 by using depth information extracted by the depth determination unit 32. The object combining unit 33 determines depth continuity and texture similarity with respect to the detected objects.

Figure 5:
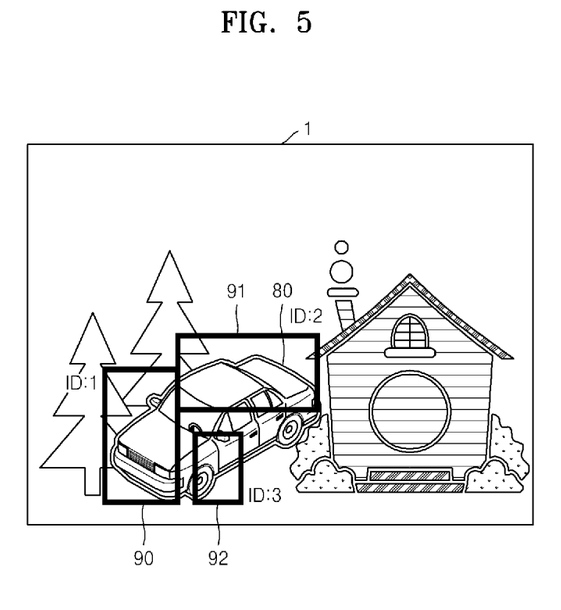
FIG. 5 is a view for describing an object detecting operation illustrated in FIG. 4, according to an exemplary embodiment.

First, it is determined whether each labeled object and adjacent labeled objects have depth continuity based on a coordinate of the each labeled object determined by the object detecting unit 31. If a difference in a depth value between objects is less than a first threshold value, it is determined that the each labeled object and the adjacent labeled objects have depth continuity. For example, since depth information of objects having ID 1 to ID 3 illustrated in FIG. 5 are similar to one another, the objects are relabeled as one object. As such, the depth continuity may be determined to prevent a case where the objects may not be combined due to different depth information when the same object is positioned diagonally. For example, when a car is parked diagonally as illustrated in FIG. 5, the car is relabeled as one object using depth continuity. However, if the objects are relabeled simply using the depth continuity, when different objects are adjacent to each other in the same depth, an error may occur. In the present invention, in order to prevent such error from occurring, depth continuity and texture similarity are determined. Texture information that may be used here includes colors, brightness, outline information, etc. of objects based on the objects labeled by the object detecting unit 31. Even though the depth continuity exists, if the texture information are not similar to each other, it is not determined to be the same object. Similarity of texture information may be determined based on a second threshold value, and the second threshold value may be set each of textures such as colors, brightness, outline information, etc., employed to determine the similarity of texture information. If a difference in texture information between objects is less than the second threshold value, it is determined that the each labeled object and the adjacent labeled objects have texture continuity so that these objects are relabeled as one object. The object combining unit 33 may reset an order of IDs assigned to objects before being combined, a coordinate, etc. Also, the object combining unit 33 may generate a new outline including all outlines generated with respect to the combined objects.

The event detecting unit 34 determines whether a position of a detected object satisfies a predetermined condition. In this regard, the predetermined condition may include various conditions such as a condition with regard to a position where the object is disposed in an image, a condition with regard to a depth of the object, a condition with regard to a time when the object is detected, etc. A condition for determining whether an event has occurred includes the condition with regard to the depth of the object, and thus, even though a moving object is detected in a specific position in the image, only when a real depth of the object satisfies a predetermined depth condition, it is determined that the event has occurred. The event detecting unit 34 may generate metadata Dmeta including information representing whether an event is detected.

An operation of the image analyzing unit 30 will now be described.

Figure 4:
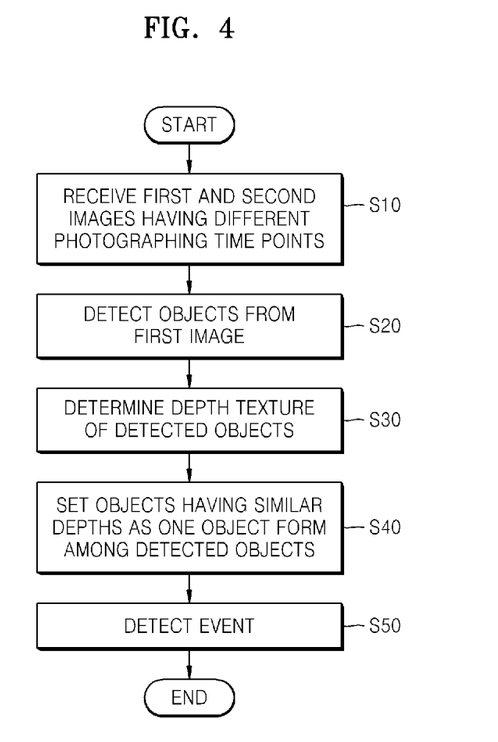
FIG. 4 is a flowchart illustrating a method of analyzing an image performed by the image analyzing unit of FIG. 3, according to an exemplary embodiment.

FIG. 4 is a flowchart illustrating a method of analyzing an image performed by the image analyzing unit 30 of FIG. 3, according to an exemplary embodiment. The method of analyzing an image illustrated in FIG. 4 will now be described with reference to FIG. 3.

Referring to FIG. 4, the method includes an image receiving operation (S10), an object detecting operation (S20), a depth and texture determining operation (S30), an object combining operation (S40), and an event detecting operations (S50).

In the image receiving operation (S10), the image analyzing unit 30 receives image data Dim including first and second images having different photographing view points.

In the object detecting operation (S20), the object detecting unit 31 detects moving objects from the image data Dim. The object detecting operation (S20) will be described in more detail with reference to FIG. 5.

FIG. 5 illustrates a first image 1, that is, a reference image, from among stereo images. In the first image 1, a car 80 is detected as a moving object entering a surveillance area, and the remaining areas are determined to be a background. In this regard, it is determined that the object is not correctly recognized as a single object and three objects are detected because the object is detected by using only a single 2D image. On the other hand, the three objects may be numbered by ID:1 to ID:3, and outlines 90 to 92 respectively surrounding the three objects may be generated.

In the depth and texture determining operation (S30), the depth determination unit 32 determines depth continuity of the detected objects, and the texture determination unit 35 determines texture similarity of the detected object. Also, in the object combining operation (S40), the object combining unit 33 combines the detected objects into one object if the depth continuity and the texture similarity satisfy a predetermined condition. The depth and texture determining operation (S30) and the object combining operation (S40) will now be described in detail with reference to FIG. 6.

Figure 6:
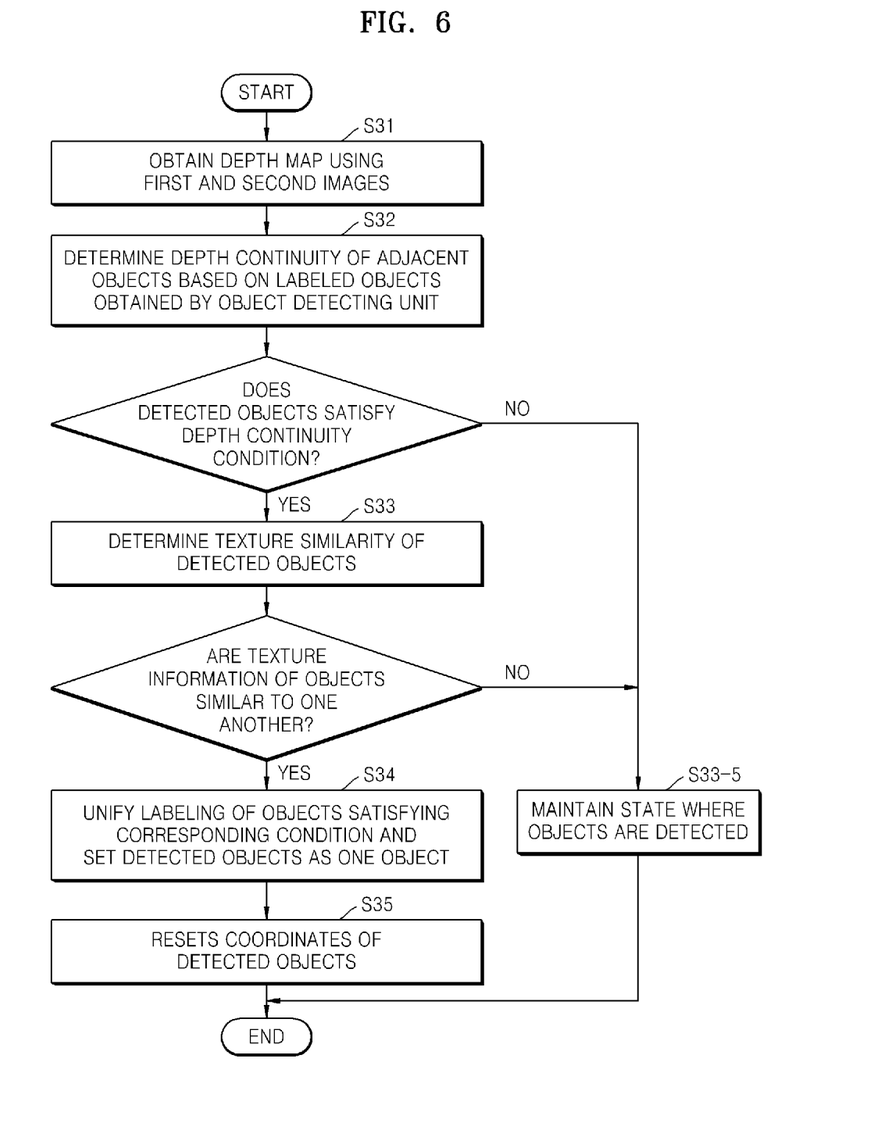
FIG. 6 is a flowchart illustrating depth and texture determining operation and an object combining operation illustrated in FIG. 4, according to an exemplary embodiment.

Referring to FIG. 6, the depth and texture determining operation (S30) includes first to third operations (S31) to (S33), and the object combining operation (S40) includes fourth and fifth operations (S34) and (S35).

Figure 7:
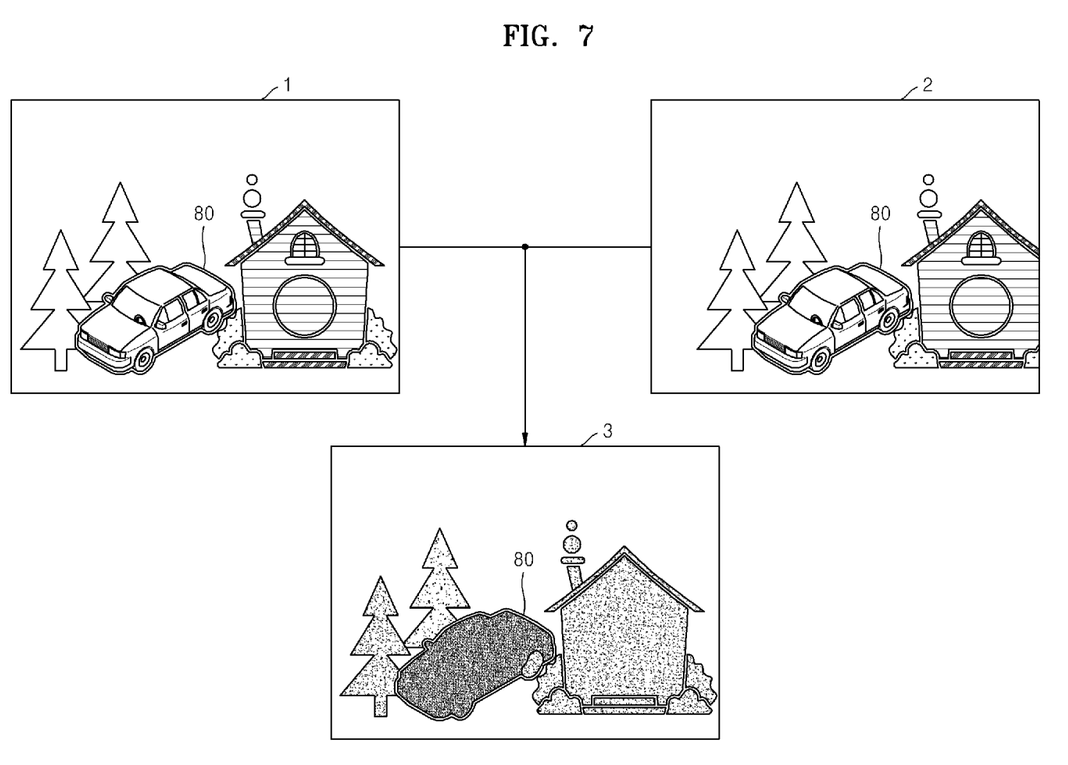
FIG. 7 is a view for describing a depth map generating operation illustrated in FIG. 6, according to an exemplary embodiment.

In the first operation (S31), the depth determination unit 32 generates a depth map 3 by using a first image 1 and a second image 2 as illustrated in FIG. 7. A depth map generating operation illustrated in FIG. 7 will now be described with reference to FIGS. 3 and 4.

Referring to FIG. 7, a disparity vector is extracted from the first image 1 on the left of a stereo image and the second image 2 on the right of the stereo image. The disparity vector may be extracted by determining a distance in which pixels in a comparison image, for example, the second image 2 have moved from their original positions in a reference image 1, for example, the first image 1. When an object is positioned close to the photographing unit 10, a variation in position of the object in an image is large according to a change in view point. Accordingly, in this case, the extracted disparity vector may be large. On the contrary, when an object is positioned away from the photographing unit 10, a variation in position of the object in an image is small. Accordingly, in this case, the extracted disparity vector may be small. After the disparity vector is extracted, the depth map 3 is generated. In the depth map 3, the car 80 is recognized as one object and is displayed, and labeling is performed on the remaining objects according to a depth thereof.

In the second operation (S32), the depth determination unit 32 determines depth continuity of adjacent objects based on the labeled objects obtained by the object detecting unit 33. That is, with reference to depth values of the adjacent objects based on the labeled objects obtained by the object detecting unit 33, if a difference between the depth values of the labeled objects is less than a threshold value, the depth determination unit 32 determines the labeled objects to be the same object, and if the difference between the depth values of the labeled objects is greater than the threshold value, the depth determination unit 32 determines the labeled objects to be different objects. If the detected objects satisfy a depth continuity condition, that is, if the depth determination unit 32 determines the detected objects to be the same object, the method proceeds to the third operation (S33), and if not, the method maintains a state where the objects are detected (S33-5).

In the third operation (S33), the texture determination unit 35 determines texture similarity of objects detected by the object detecting unit 31. That is, the texture determination unit 35 detects texture information of the detected objects in the depth map, and determines whether the texture information of the detected objects are similar to one another. If it is determined that the texture information of the detected objects are similar to one another, the texture determination unit 35 resets outline coordinates of the detected objects, and if not, the method maintains a state where the objects are detected (S33-5).

In the fourth operation (S34), the object combining unit 33 compares coordinates between the labeled depth map 3 and the objects detected from the reference image. That is, when two or more detected objects have similar depths and texture similarity, the object combining unit 33 sets the detected objects as one object and combines the objects.

In the fifth operation (S35), an outline coordinate of the combined object is reset. That is, as illustrated in FIG. 8, a new outline 93 including all existing outlines 90 to 92 is generated, and the existing outlines 90 to 92 are replaced with the new outline 93.

Figure 8:
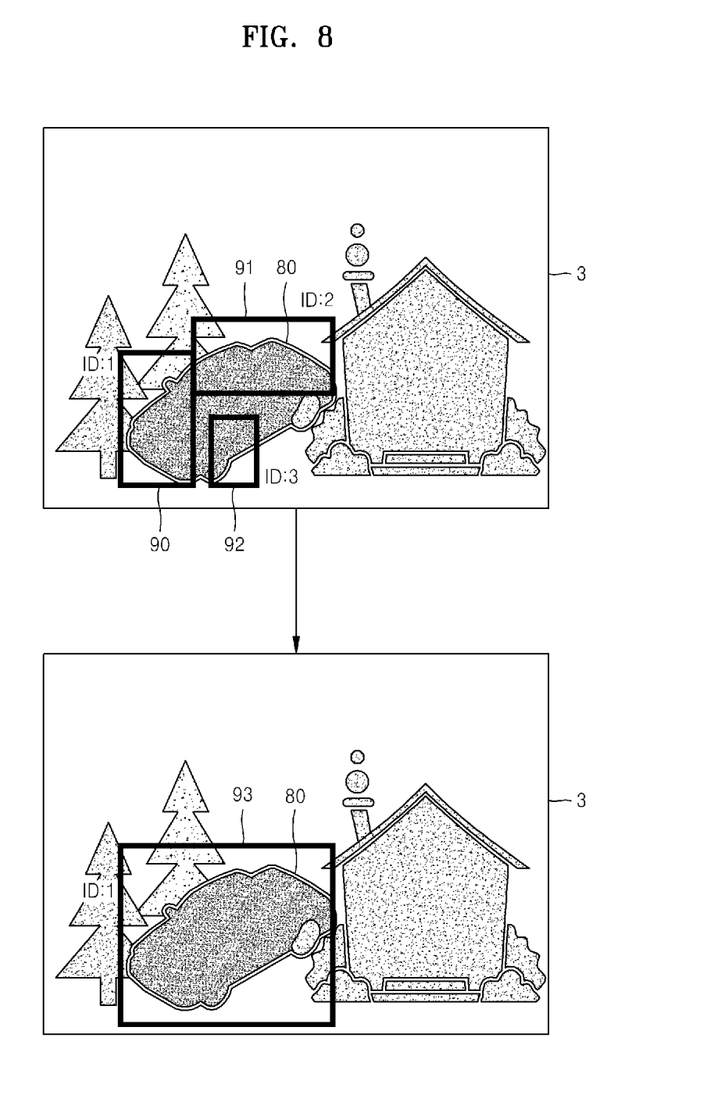
FIG. 8 is a view for describing the object combining operation illustrated in FIGS. 4 and 6, according to an exemplary embodiment.

FIG. 8 is a view for describing the object combining operation (S40) illustrated in FIGS. 4 and 6. Referring to FIG. 8, three objects are detected in a reference image, the outlines 90 to 92 of the three objects are formed, and the outlines 90 to 92 are displayed in the depth map 3. When coordinates of the detected three objects are compared with the depth map 3, the detected three objects have similar depth in the depth map 3, and texture information of the detected three objects are similar to one another. Accordingly, the object combining unit 33 determines depth continuity and similarity of the texture information of the objects, and if the depths of the objects are similar to one another and if the texture information of the objects are similar to one another, the object combining unit 33 resets the existing IDs ID:1 to ID:3 as a new ID ID:1.

In the event detecting operations (S50), the event detecting unit 34 detects whether an event has occurred from the detected objects. The event detecting operations (S50) will now be described in detail with reference to FIGS. 9 and 10.

Figure 9:
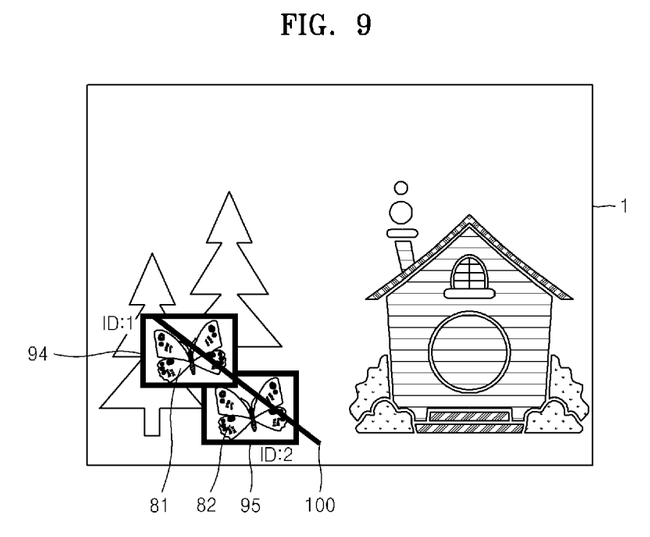
FIGS. 9 and 10 are views for describing an event detecting operation illustrated in FIG. 4, according to an exemplary embodiment.

Referring to FIG. 9, two butterflies are detected as two moving objects 81 and 82. The event detecting unit 34 assigns IDs ID:1 and ID:2 to the objects 81 and 82, and forms outlines 94 and 95 of the objects 81 and 82. In this regard, the event detecting unit 34 sets an event detecting line 100 as an event detection condition. The event detecting line 100 includes a depth condition. In this regard, positions of the objects 81 and 82 overlap with the event detecting line 100, but depths of the objects 81 and 82 are significantly different from the depth condition. As such, since the depths of the objects 81 and 82 do not satisfy the depth condition, the event detecting unit 34 determines that an event has not occurred.

Figure 10:
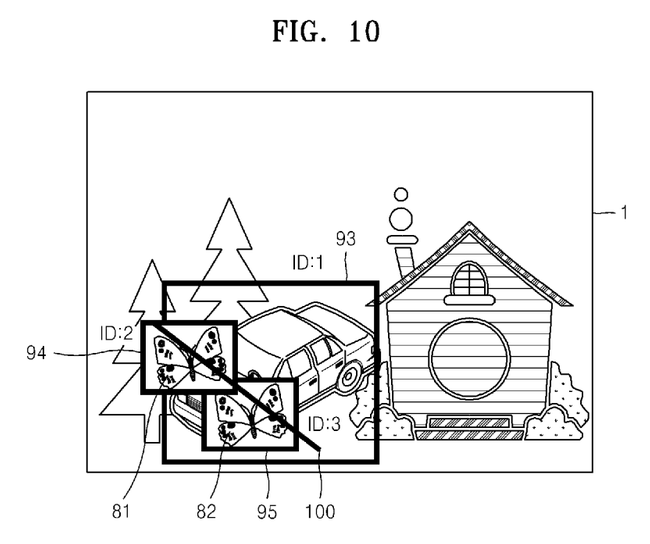

Referring to FIG. 10, two butterflies and a car are detected as three moving objects 80 to 82. The event detecting unit 34 assigns IDs ID:1 to ID:3 to the objects 80 to 82 and forms outlines 93 to 95 of the objects 80 to 82. Positions of the three objects 80 to 82 overlap with the event detecting line 100. In this regard, since depths of the objects 80 to 82 do not satisfy a predetermined depth condition, the event detecting unit 34 determines that an event has not occurred. Meanwhile, when the object 80 is a car, the event detecting unit 34 determines that the depth of the object 80 satisfies a predetermined depth condition and determines that an event has occurred.

When a user does not desire a condition for depth information when detecting an event, the condition for depth information may be excluded when detecting an event. For example, in FIG. 10, when a user does not desire a depth condition or removes the depth condition, the event detecting unit 34 determines that the objects 80 to 82 satisfy an event condition.

In the above-described exemplary embodiments, an image is analyzed using depth information extracted from a 3D image or a stereo image, and thus, an object may be correctly detected, thereby increasing reliability of a surveillance performance with respect to a surveillance area.

According to a surveillance apparatus and a surveillance method in the above-described exemplary embodiment, a surveillance performance with respect to a surveillance area may be increased.

A program, such as an algorithm, for executing the above-described exemplary embodiments and modified examples thereof in an image processing apparatus may be recorded in a recording medium. The recording medium may be a semiconductor recording medium (for example, a flash memory), or the like.

The term "unit" as used herein means a hardware component, such as a processor or circuit, and/or a software component that is executed by a hardware component such as a processor.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An image processing apparatus comprising:
an object detector which detects a plurality of objects from at least one of two or more images captured by two or more image capture devices which photograph a surveillance area from two or more view points, respectively;
a depth determiner which determines depths of the plurality of objects based on the two or more images, the depths being respective distances between the plurality of objects and at least one of the image capture devices; and
an object combiner which determines two objects, which have been detected as two objects by the object detector, among the plurality of objects as different objects if a difference between depths of the two objects is determined to be equal to or greater than a first threshold value, and determines the two objects as one object if the difference is determined to be less than the first threshold value,
wherein the first threshold value is greater than zero (0),
wherein the image processing apparatus further comprises a texture determiner which determines texture similarity between the two objects by detecting texture information thereof, and
wherein the object combiner determines the two objects, determined as one object based on the depth difference, as different objects, if a difference between texture information of the two objects is determined to be equal to or greater than a second threshold value, and confirms that the two objects, determined as one object based on the depth difference, as one object if the difference between the texture information of the two objects is determined to be less than the second threshold value.

2. The image processing apparatus of claim 1, wherein when the object detector detects the plurality of objects, the object detector generates outlines of the two objects in at least one of the two or more images and labels the two objects differently, and
wherein the object combiner determines the two differently labeled objects as one object if the difference between the depths of the two differently labeled objects is determined to be less than the first threshold value and the difference between the texture information of the two differently labeled objects is determined to be less than the second threshold value.

3. The image processing apparatus of claim 2, further comprising an event detector which indicates that an event has occurred if at least one of the plurality of objects is determined to be a moving object and have a depth satisfying a specific condition.

4. The image processing apparatus of claim 2, wherein the object combiner determines the two differently labeled objects as two different objects if the difference between the texture information of the two differently labeled objects is determined to be equal to or greater than the second threshold value even though the difference between the depths of the two differently labeled objects is determined to be less than the first threshold value.

5. The image processing apparatus of claim 2, wherein the object combiner relabels the two differently labeled objects as one object using one outline if the difference between the depths of the two differently labeled objects is determined to be less than the first threshold value and the difference between the texture information of the two differently labeled objects is determined to be less than the second threshold value.

6. The image processing apparatus of claim 5, further comprising an event detector which indicates that an event has occurred if at least one of the plurality of objects is determined to be a moving object and have a depth satisfying a specific condition.

7. The image processing apparatus of claim 1, wherein the two objects are adjacent to each other.

8. An image processing method comprising:
detecting a plurality of objects from at least one of two or more images captured by two or more image capture devices which photograph a surveillance area from two or more view points, respectively;
determining depths of the plurality of objects based on the two or more images, the depths being respective distances between the plurality of objects and at least one of the image capture devices; and
determining two objects, which have been detected as two objects in the detecting, among the plurality of objects as different objects if a difference between depths of the two objects is determined to be equal to or greater than a first threshold value, and determining the two objects as one object if the difference is determined to be less than the first threshold value,
wherein the first threshold value is greater than zero (0),
wherein the image processing method further comprises:
determining texture similarity between the two objects by detecting texture information thereof;
determining the two objects, determined as one object based on the depth difference, as different objects, if a difference between texture information of the two objects is determined to be equal to or greater than a second threshold value; and confirming that the two objects, determined as one object based on the depth difference, as one object if the difference between the texture information of the two objects is determined to be less than the second threshold value.

* * * * *